US007429026B2

(12) United States Patent
Romportl

(10) Patent No.: US 7,429,026 B2
(45) Date of Patent: Sep. 30, 2008

(54) CONCRETE BLOCK TECHNOLOGY

(76) Inventor: Robert H. Romportl, W9562 Highway 70, Spooner, WI (US) 54801

( * ) Notice: Subject to any disclaimer, the term of this patent is extended or adjusted under 35 U.S.C. 154(b) by 174 days.

(21) Appl. No.: 11/294,089

(22) Filed: Dec. 5, 2005

(65) Prior Publication Data

US 2007/0125932 A1 Jun. 7, 2007

(51) Int. Cl.
*B28B 7/00* (2006.01)
*B29C 33/00* (2006.01)

(52) U.S. Cl. ........................... 249/76; 249/74; 249/119; 249/120; 249/129; 249/131; 249/160; 249/166

(58) Field of Classification Search ................ 249/66.1, 249/74, 76, 117, 120, 123, 154, 166, 187.1, 249/216, 119, 129–132, 159–160, 193–194; 425/108, 177, 185, 186, 189, 262, 351, 357, 425/422, 182, 436 R, 441, 444, 436 RM
See application file for complete search history.

(56) References Cited

U.S. PATENT DOCUMENTS 1,285,056 A * 11/1918 Cutler ......................... 249/85
1,572,305 A * 2/1926 Nelson ......................... 249/63
1,729,984 A * 10/1929 Canfield ...................... 249/76
1,754,087 A * 4/1930 Flam .......................... 249/129
1,760,282 A * 5/1930 Pedersen ..................... 249/93
2,460,697 A * 2/1949 Kreger ...................... 249/66.1
2,477,320 A * 7/1949 Tyroler ........................ 249/18
2,528,931 A * 11/1950 White ........................ 425/424
2,570,384 A * 10/1951 Titus .......................... 249/85
2,619,046 A * 11/1952 Henderson ................... 249/76
2,807,970 A * 10/1957 Dorman ....................... 72/340
2,847,749 A * 8/1958 Lang .......................... 425/335
3,070,867 A * 1/1963 Belle .......................... 249/210
3,176,369 A * 4/1965 Dennis et al. ............... 425/254
3,207,466 A * 9/1965 Vance ......................... 249/85
3,246,870 A * 4/1966 Valdastri Sr. ................. 249/74
4,087,072 A * 5/1978 Olsen ......................... 249/129
4,254,932 A * 3/1981 Durbin ........................ 249/42
4,431,397 A * 2/1984 Fried et al. .................. 425/384

(Continued)

*Primary Examiner*—Philip C Tucker
*Assistant Examiner*—Dimple N Bodawala
(74) *Attorney, Agent, or Firm*—Skinner & Associates

(57) ABSTRACT

A mold, process of using the mold to form a block, and the resultant block are disclosed. The block may of course be connected to other blocks to form stuctures such as walls. The blocks and structures may have curved features for simulating a log structure. The mold and process utilize cemititious material for forming a the block, which has a pair of block members, one of which has a curved outer face. The block members are separated by a central insulation space and connected by rods extending from each block member across the central insulation space. The mold has a body including a pair of block forming cavities. Each cavity has a material ingress-egress opening adapted to receive a block forming composition and to output a block. The block forming cavities are separated a predetermined distance by a space forming central cavity. The mold also has a block ejector movably connected to the body. The ejector has a plate member associated with each cavity, and a handle. The blocks disclosed include pair of block members, one of which has a curved outer face. The block members are separated by a central insulation space and connected by at least one block connector extending from each block member across the central insulation space.

18 Claims, 12 Drawing Sheets

U.S. PATENT DOCUMENTS 4,632,691 A * 12/1986 Smith et al. .................. 65/273
4,802,649 A * 2/1989 Salazar ........................ 249/21
4,877,387 A * 10/1989 Fierkens et al. ............. 425/116
5,866,026 A * 2/1999 Johnston ..................... 249/119
6,189,282 B1 * 2/2001 VanderWerf ............... 52/582.1
2001/0020757 A1 * 9/2001 Fried et al. .................. 264/443

* cited by examiner

CONCRETE BLOCK TECHNOLOGY

37 C.F.R. §1.71(e) AUTHORIZATION

A portion of the disclosure of this patent document contains material which is subject to copyrigth protection. The copyright owner has no objection to the facsimile reproduction by anyone of the patent document or the patent disclousure, as it appears in the US Patent and Trademark Office patent file or records, but otherwise reserves all copyrights whatsoever.

CROSS-REFERENCE TO RELATED APPLICATIONS, IF ANY

Not applicable.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates, generally, to concrete block structures and methods, and concrete blocks and methods. Particularly, the invention relates to buildings, walls and other structures constructed of concrete blocks and having the appearance of a log structure; method of making such structures; concrete blocks having the appearance of log portions; methods of making and using such blocks; and apparatus and methods for making such structures and blocks. The invention is particularly useful for constructing a building such as a residential home or the like which is strong, decorative, efficient, long lasting, and economical to build and maintain.

2. Background Information

The state of the art includes various building structures, structural building elements, and building and manufacturing methods and apparatus, including those relating to concrete.

This technology is believed to have significant limitations and shortcomings, including but not limited to that they are not strong, decorative, efficient, long lasting, and economical to build and maintain, either individually or in combination.

For this and other reasons, a need exists for the present invention.

All US patents and patent applications, and all other published documents mentioned anywhere in this application are incorporated by reference in their entirety.

BRIEF SUMMARY OF THE INVENTION

The invention provides buildings and other structures constructed of concrete blocks and having the appearance of a log structure; methods of making such structures; concrete blocks having the appearance of log portions; methods of making and using such blocks; and apparatus and methods for making such structures and blocks which are practical, reliable, accurate and efficient, and which are believed to fulfil the need and to constitute an improvement over the background technology.

A mold, process of using the mold to form a block, and the resultant block are disclosed. The block may of course be connected to other blocks to form stuctures such as walls. The blocks and structures may have curved features for simulating a log structure. The mold and process utilize cemititious material for forming a the block, which has a pair of block members, one of which has a curved outer face. The block members are separated by a central insulation space and connected by rods extending from each block member across the central insulation space. The mold has a body including a pair of block forming cavities. Each cavity has a material ingress-egress opening adapted to receive a block forming composition and to output a block. The block forming cavities are separated a predetermined distance by a space forming central cavity. The mold also has a block ejector movably connected to the body. The ejector has a plate member associated with each cavity, and a handle. The blocks disclosed include pair of block members, one of which has a curved outer face. The block members are separated by a central insulation space and connected by at least one block connector extending from each block member across the central insulation space.

In one aspect, the invention provides a mold comprising a body including a pair of block forming cavities each having a material ingress-egress opening adapted to receive a block forming composition and to output a block, the block forming cavities being separated a predetermined distance by a space forming central cavity; and a block ejector movably connected to the body and including a plate member associated with each cavity, and a handle.

In a more particular aspect, the invention provides a mold for cemititious material for forming a block having a pair of block members, one of which has a curved outer face, the block members being separated by a central insulation space and connected by rods extending from each block member across the central insulation space, comprising:

a. a body including:

i. a first body member having an inner wall member disposed adjacent the central cavity, a curved outer wall member, and a pair of side wall members connecting the outer and inner wall members at oppose ends, the wall members of the first body member defining a first block forming cavity of a predetermined configuration, the first block forming cavity having a material ingress-egress opening adapted to receive a block forming composition and to output a first formed block member, and an ejector plate opening disposed at an end of the block forming cavity opposite the ingess-egress opening;

ii. a second body member having an inner wall member disposed adjacent a central cavity between the first block forming cavity of the first body member, an outer wall member, and a pair of side wall members connecting the outer and inner wall members at oppose ends, the wall members defining a second block forming cavity of a predetermined configuration, the second block forming cavity having a material ingress-egress opening adapted to receive a block forming composition and to output a second block member, and an ejector plate opening disposed at an end of the second block forming cavity opposite the ingess-egress opening, the first and second block forming cavities being separated a predetermined distance by the space forming central cavity;

iii. a pair of connector plates which connect the first and second body members to each other at opposite ends, the connector plates mating with the side wall members of the first and second body members; and b. a block ejector movably connected to the body and including a plate member associated with each cavity, and a handle.

In another aspect, the invention provides a method of making a block comprising the steps of:

a. providing a mold comprising a body including a pair of block forming cavities each having a material ingress-egress opening adapted to receive a block forming composition and to output a block, the block forming cavities being separated a predetermined distance by a space forming central cavity; and a block ejector movably connected to the body and including a plate member associated with each cavity, and a handle;

b. adding block forming composition into each block forming cavity through the respective material ingress-egress opening;

c. placing at least one connecter in the block forming composition of one block forming cavity and extending it across the space of the central cavity to the block forming compostion of the other block forming cavity;

d. ejecting a block from the mold; and e. curing the block;

In a further aspect, the invention provides a block for use in building a structure, comprising a pair of block members, one of which has a curved outer face, the block members being separated by a central insulation space and connected by at least one block connector extending from each block member across the central insulation space.

The features, benefits and objects of the invention will become clear to those skilled in the art by reference to the following description, claims and drawings.

DETAILED DESCRIPTION

The invention provides, in general:

1. buildings and other structures constructed of concrete blocks and having the appearance of a log structure;
2. methods of making such structures; concrete blocks having the appearance of log portions;
3. methods of making and using such blocks; and
4. apparatus and methods for making such structures and blocks.

The benefits of the invention include, but are not necessarily limited to, in general:

1. the building or other structure produced with the blocks is strong, storm proof, waterproof, and resistant to decay and insect damage,
2. the building or other structure produced with the blocks is decorative, having the appearance of being constructed of logs instead of concrete blocks or poured concrete,
3. the building or other structure produced with the blocks is efficient to build, use, heat and maintain,
4. the building or other structure produced with the blocks is long lasting, and
5. the building or other structure produced with the blocks is economical to build, use, heat and maintain.

Figure 1:
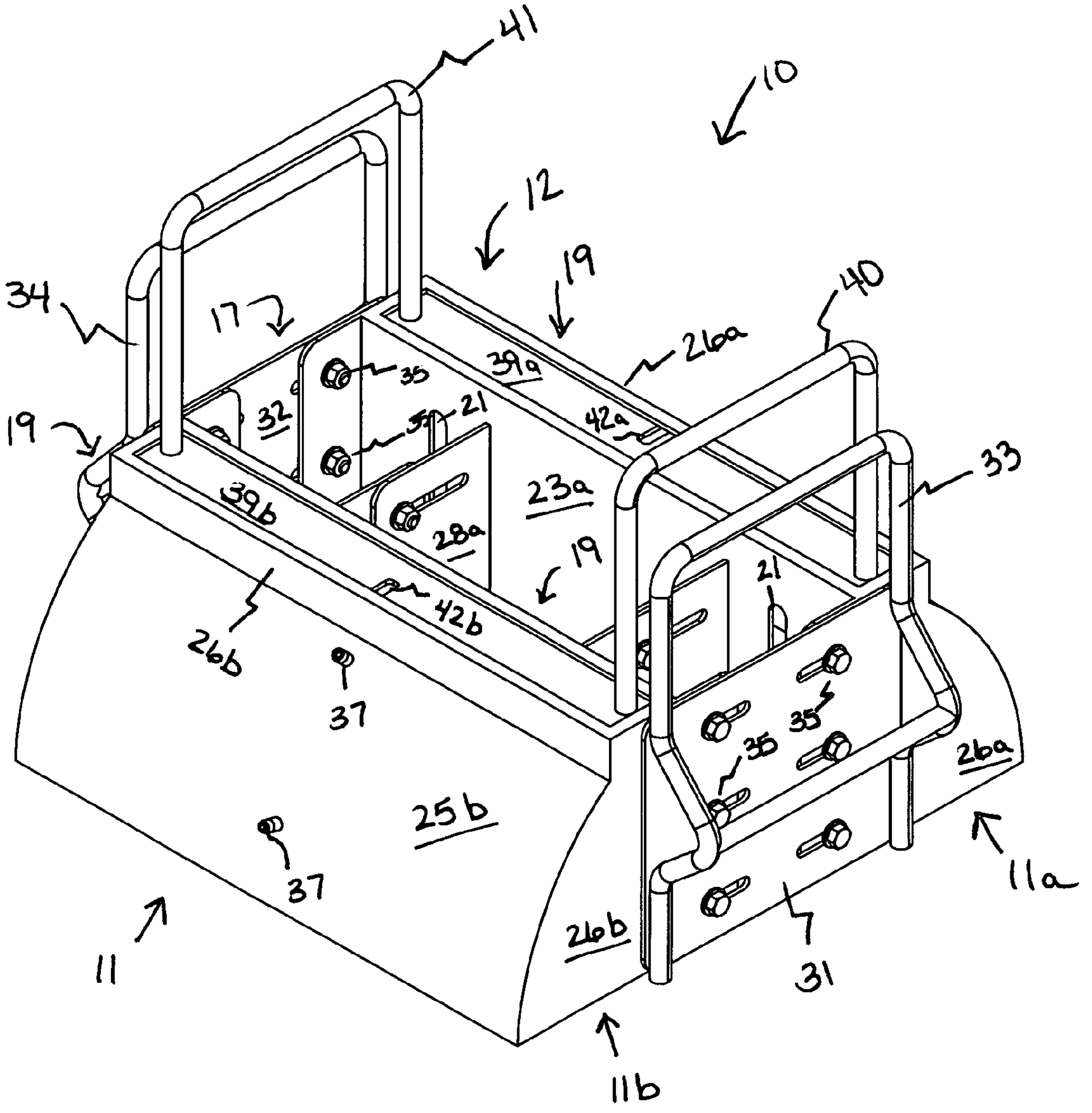
FIG. 1 is a perspective view of an embodiment of a mold of the present invention for making an embodiment of the building block of the present invention.
Figure 2:
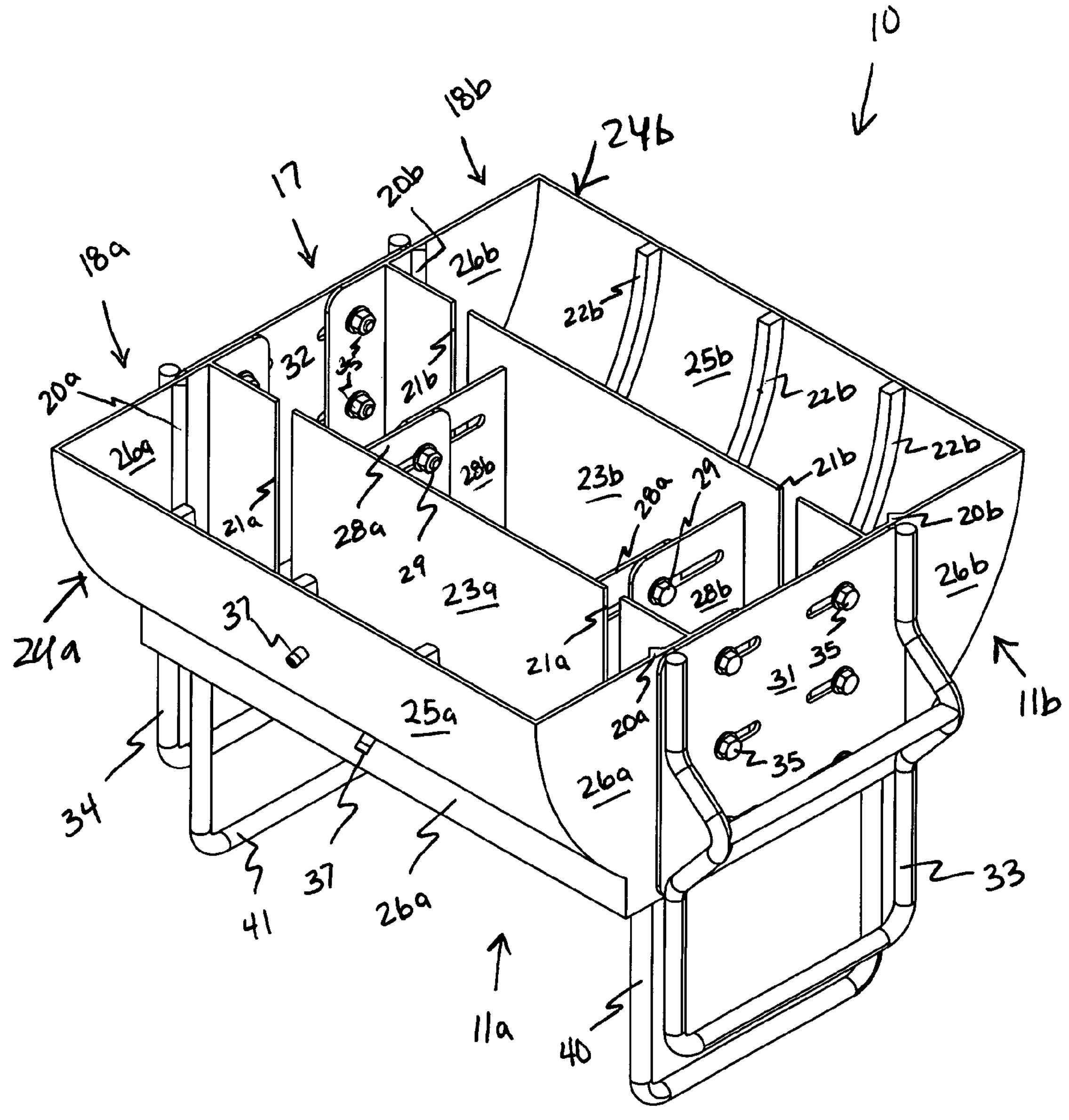
FIG. 2 is a perspective view of the mold of FIG. 1, shown inverted and ready to receive a concrete mixture to produce a full block with an interior curved face and an exterior curved face.

Referring to FIGS. 1, 2, and 7-10, an embodiment of a mold 10 of the present invention includes a body formed by a pair of body members 11*a* and *b* and a press 12. The body members 11 and press 12 are preferably constructed of metal, such as steel. The mold 10 is initially disposed as shown in FIG. 2 to receive a cemititous composition such as cement. The composition may be compacted, for example by vibrating. Thereafter, the mold 10 is inverted as shown in FIG. 1. Thereafter, the press 12 is pushed downward to eject a wet block. The block is cured, for example by setting a predetermined period of time to form a complete, dry, rigid block, for example block 50 shown in FIG. 11A.

The mold 10 body members 11*a* and *b*, each preferably comprise an inner wall or inner wall member 23, an outer wall or outer wall member 24, and side walls or side wall members 26. In the following text, letter designations "a" and "b" pertaining to the two primary sides of the mold 10 are omitted for ease of reading. Thus, for example, the term "inner wall 23" is used to refer to both the "inner wall 23*a*" and "inner wall 23*b*" structures shown in the drawings, unless otherwise indicated. The inner wall 23 is preferably substantially flat, while the outer wall 24 has a major curved face portion 25 and a minor flat face portion 26. The flat side walls 26 connect the inner and outer walls 23 and 24, preferably at a right angle. Each body 11 has a wide opening 18 forming a block forming cavity, and for ingress of concrete and egress of the cured block, and a narrow bottom opening 19 for insertion of the press 12. Each body member 11 also preferably has a pair of complementary, parallel, mating connector panels 28, which are substantially flat and have a predetermined length extending away from it's respective inner wall 23. The bodies 11*a* and *b* are further connected by connection panels 31 and 32 at opposite ends. The connector panels 31 and 32 are shown to be substantially flat and have a predetermined dimension. Panels 28, 31 and 32 preferably have a plurality of slots for adjustable mating by connectors 35. Connectors 35 are preferably bolts, but may be screws or other fasteners. The bodies 11 are therefore adjustably separated by a central insulation space 17, which is open at its top and bottom ends. Inner walls 23 have aligned, vertically oriented slots 21, which are open at one end (See FIG. 2). The slots 21 permit placement of connectors such as metal rods (for example, common rebar material) plastic, fiberglas or other rigid or semi-rigid material into the concrete mixture in each body 11 cavity, which connectors extend across the central space 17 and connect the block bodies shown in FIG. 11A for example.

Figures 11A, 11B, 11C:
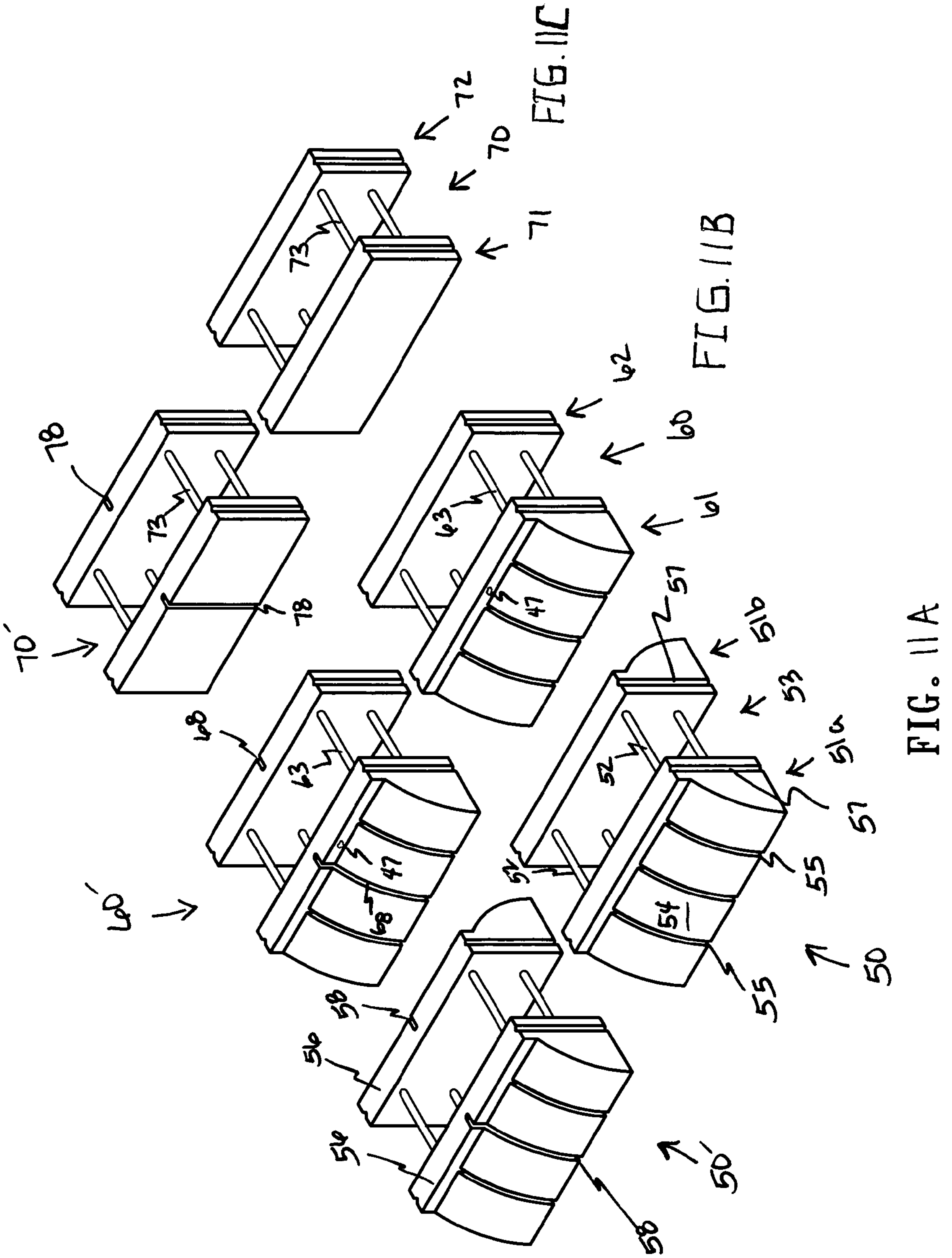
FIG. 11*a* illustrates a pair of blocks produced by a mold of the present invention, the blocks being full blocks and having curved interior and exterior faces.
FIG. 11*b* illustrates a pair of blocks produced by a mold of the present invention, the blocks being full blocks and having a curved exterior faces and an flat interior faces.
FIG. 11*c* illustrates a block produced by a mold of the present invention, the block being full and having flat interior and exterior faces.

The curved surface of face 25 preferably forms a quarter cylinder configuration, which forms the outer surface of one block 50. This surface is preferably mated with another block to form a half or hemi cylinder structure 82 as shown for example in FIG. 12. Plural courses of structures 82 and 55 are preferably mated to form a wall 80 or other structure having the general appearance of one being formed of logs or timbers. The faces 25 preferably have one or more (preferably three) ribs 22. Two outer ribs are shown to be permanently affixed to the faces 25, while a third center rib is removable, and affixed with a screw 37 through aperture 38. The ribs 22 form stucco grooves 55 in the face 54 of the resultant blocks 50 as shown in FIG. 11A for example. Side walls 27 preferably have connection ribs 20 which form mortar grooves 57 in the sides of the blocks 50 also shown in FIG. 11A. The bottom portion of the bodies 11 generally at flat side walls 26 form course supporting edges 56 in blocks 50 shown in FIG. 11A. Space 17 forms insulation space 53 in the blocks 50 of FIG. 11A. Rods 52 extend cross space 53 between block members 51*a* and *b*. The faces 25 also preferably have one or more plugs or blocks 46, shown in FIGS. 7, 8 and 10, disposed in the flat side walls 26 which extend through the cavity to create apertures 47 in the formed block body 50, as shown in FIG. 11B. The apertures 47 permit injection of insulation or other material into the space 53 from the exterior.

Handles 33 and 34 are connected to the connection plates 31 and 32. The handles 33 and 34 have a predetermined extension length and serve as stands or legs for the mold 10 when it is in a concrete receiving mode as shown in FIG. 2, and serve as manual grasping and lifting means when the mold 10 is in a block ejection mode as shown in FIG. 1.

Press 12 includes a pair of flat press panels 39 which are connected by press handles 40 and 41. The panels 39 have a predetermined dimension which corresponds to the area of the body 11 openings 19, and serve as a bottom concrete containment surface during curing. During block ejection, the handles 40 and 41 are pressed downward (relative to FIG. 1). Panels 39 preferably have one or more slots 42 which permit movement of the panel 39 around ribs 22.

Figure 13:
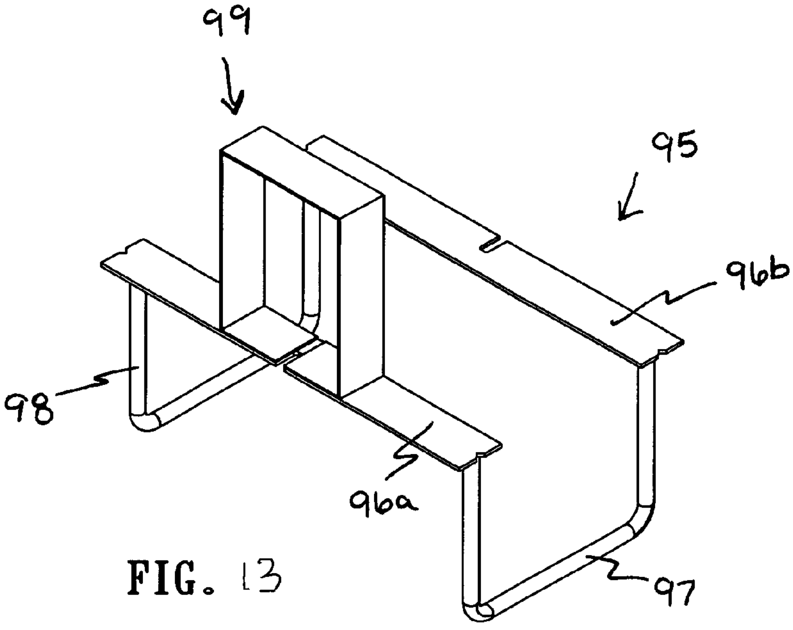
FIG. 13 is a perspective view of an embodiment if a discharge member of a mold, the discharge member further having a cut-out member disposed thereon for producing a utility enclosure in a block.

An alternative embodiment of the press 95 is shown in FIG. 13 for forming a utility cutout in a wall. The utility cut out may be used to place electrical or plumbing hardware in a block located in a predetermined location on a wall or other structure. The cutout may be disposed on an interior or exterior wall, provided it is a flat wall. The press 95 comprises a pair of panels 96*a* and *b*, a material holding frame 99, in the form of a rectangular box, for example, and a pair of handles 97 and 98. The frame holds back material inserted in a mold to form a cavity in the resultant block (not shown).

Figure 3:
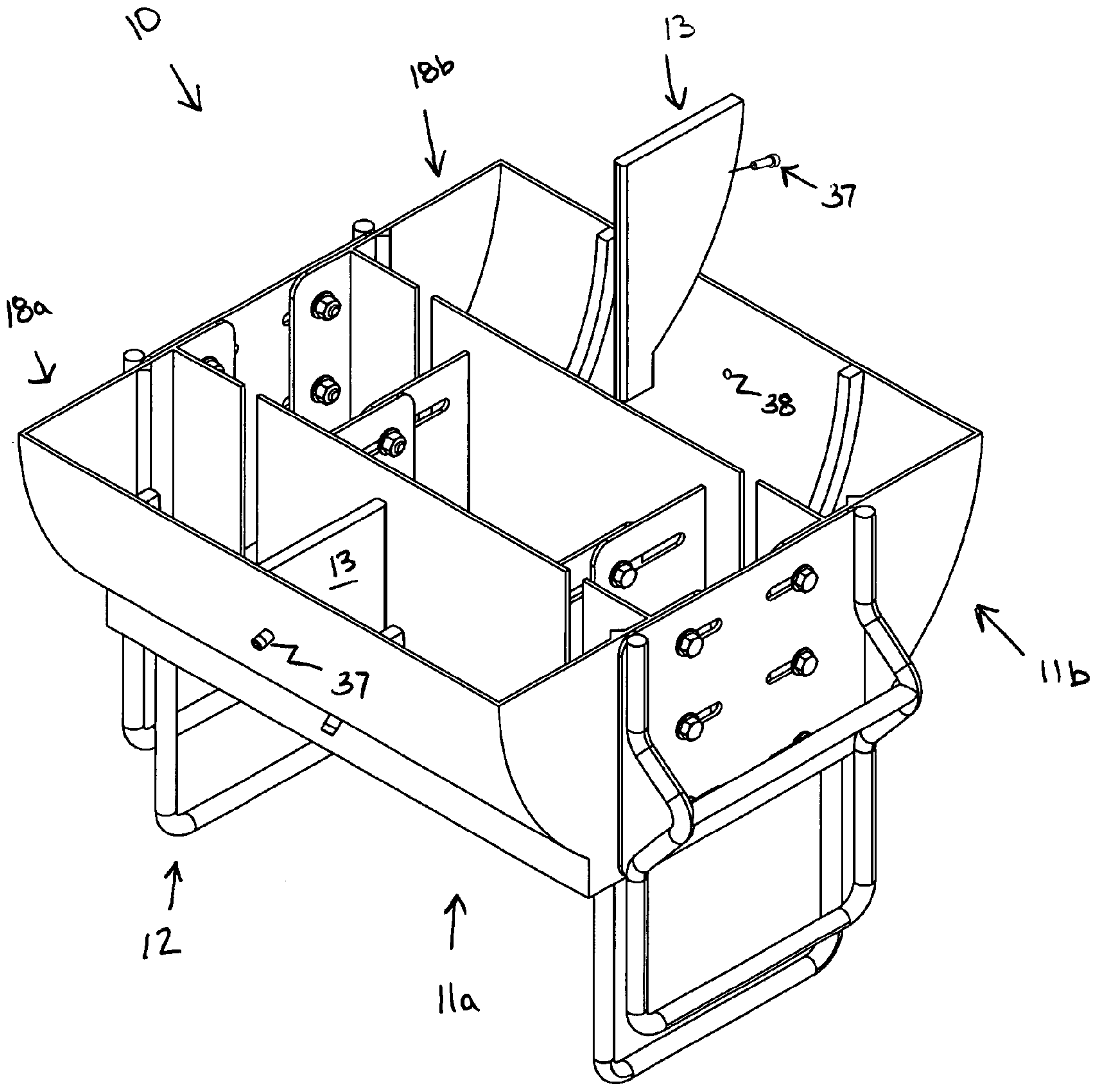
FIG. 3 is a perspective view of the mold of FIG. 2, further showing a half block insert (one operatively placed and the other being placed) for producing a half block, with interior and exterior curved faces.

FIG. 3 shows optional half block inserts 13 being deployed and deployed in openings 18*b* and *a* of mold 10. Inserts 13 are held in place by fasteners 37, for example screws, disposed through apertures 38. The half block inserts 13 can be used to form blocks which are one half the size of a normal block 50. The inserts 13 is swappable with center rib 22.

Figure 4:
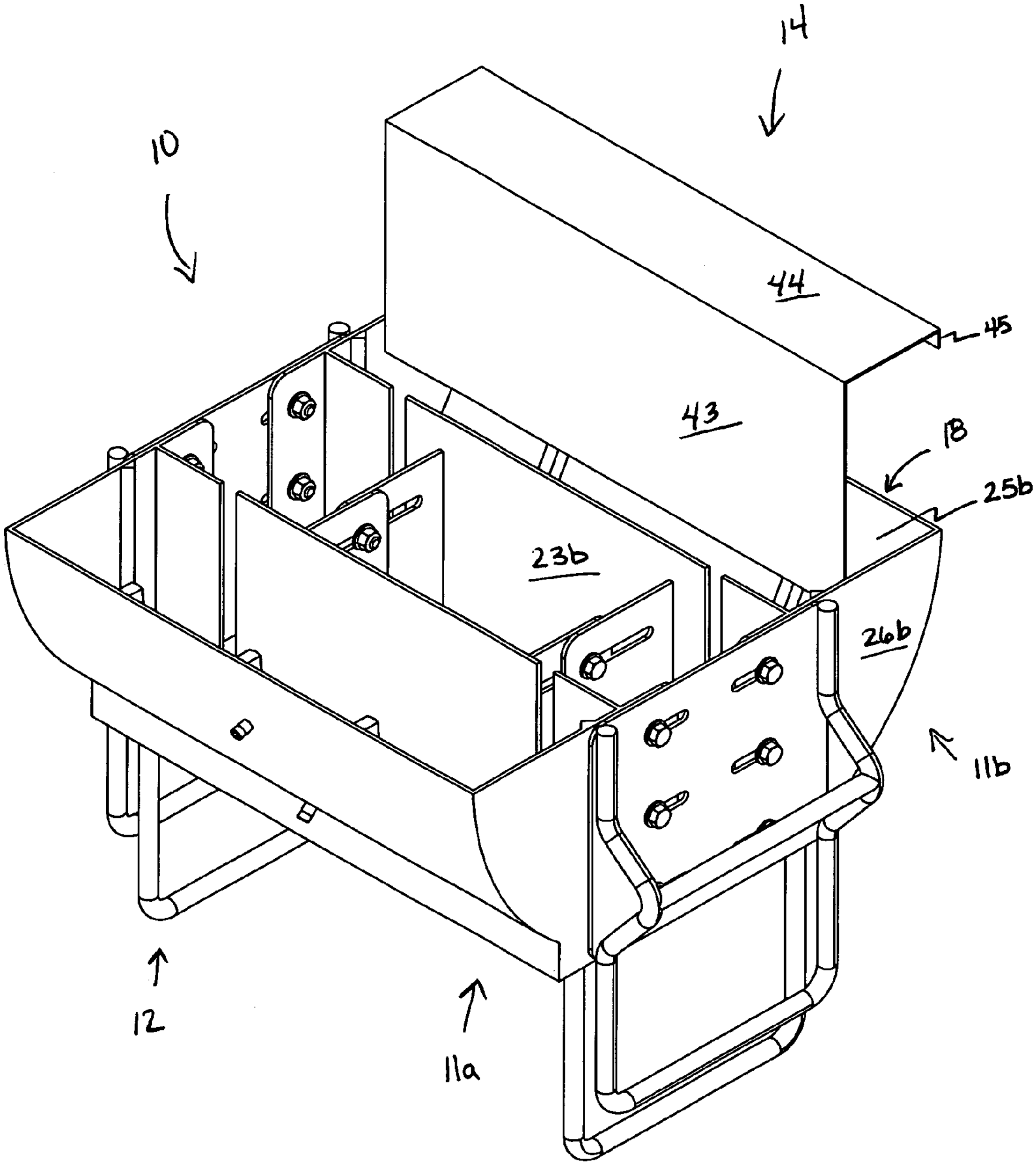
FIG. 4 is a perspective view of the mold of FIG. 2, further showing an interior wall, flat wall insert being placed, for producing a full block with a curved exterior face and an interior flat face.
Figure 5:
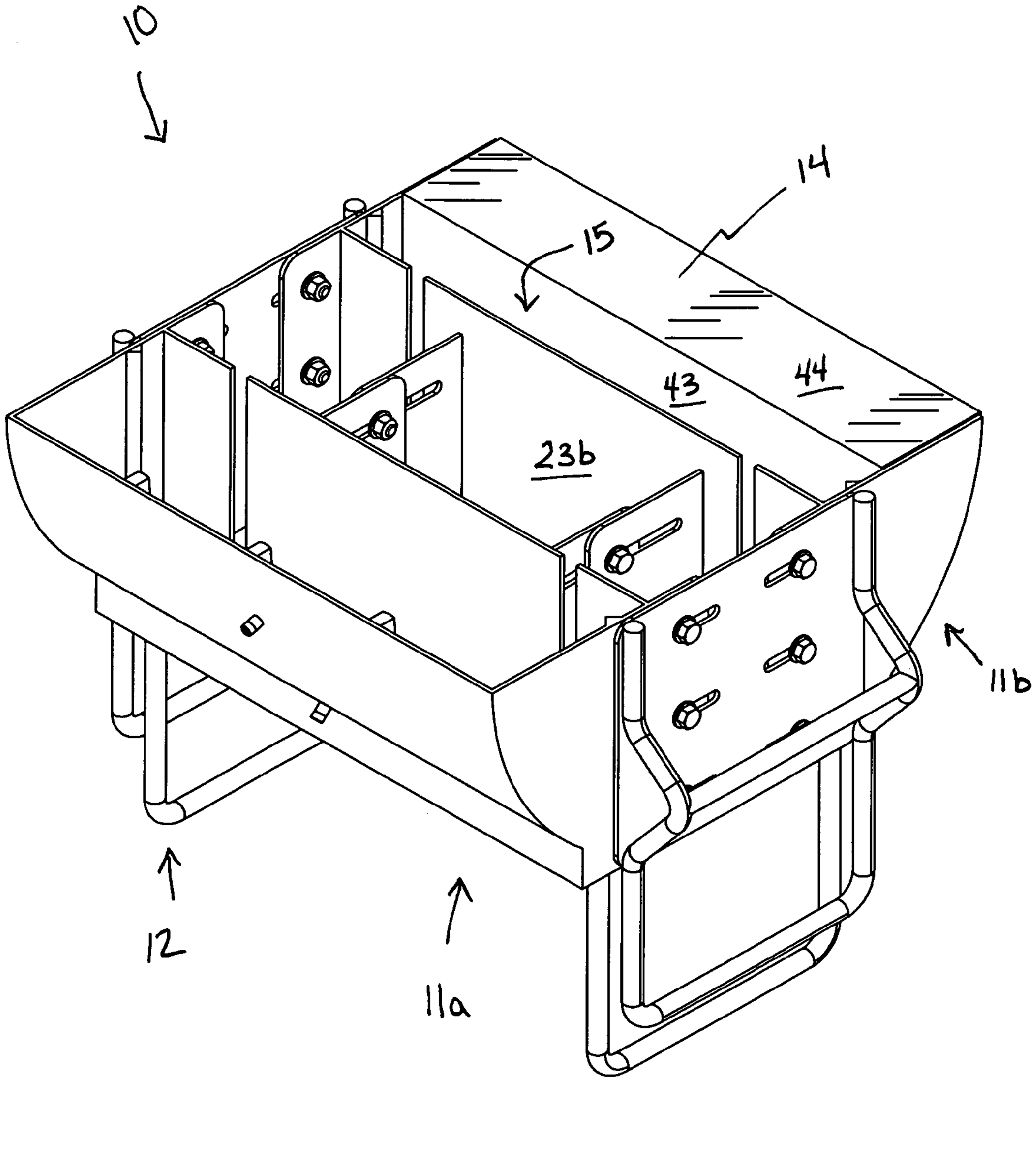
FIG. 5 is a perspective view of the mold of FIG. 4, further showing the interior wall, flat wall insert operatively placed for producing a full block with a curved face and a flat face.
Figure 17:
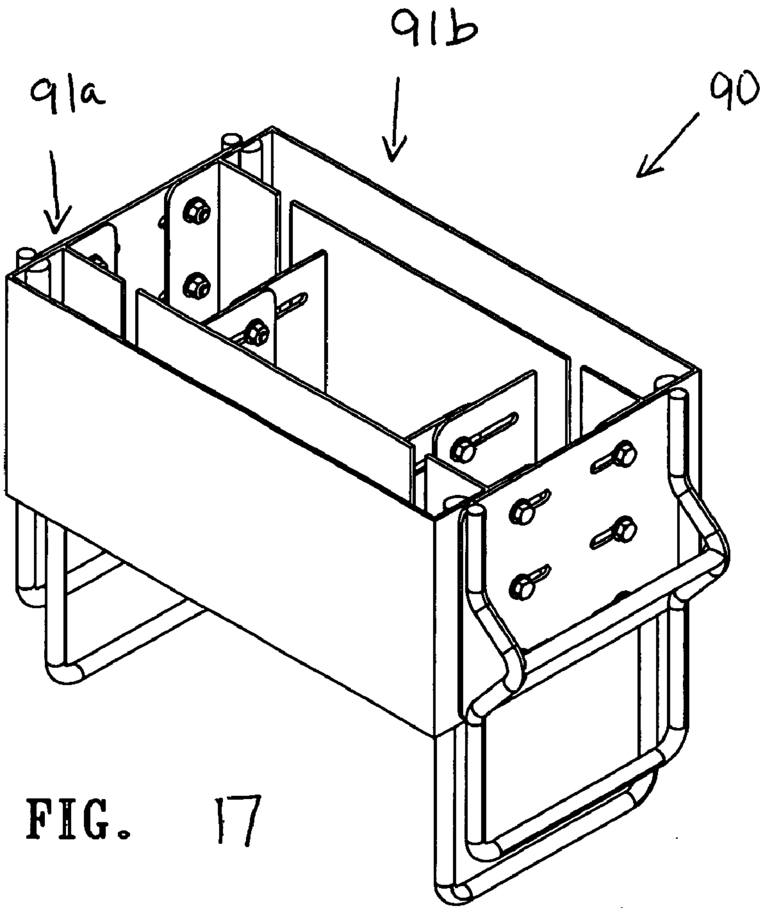
FIG. 17 is a perspective view of an embodiment of the mold of the present invention, constructed and arranged to produce a block having flat interior and exterior walls.

FIGS. 4 and 5 show an optional flat wall insert 14 being deployed and fully deployed in opening 18 of mold 10 to create a flat inside and a curved outside surface in body 11*b*. The resulting block 60 is shown for example in FIG. 11B with curved exterior surface member 61 and flat wall member 62 spanned by rods 63. The flat surface can be used for an interior wall or any other wall or surface which is desired to be flat in contrast to log-shaped. Inserts 14 preferably have a vertical wall 43, a horizontal ledge 44 and a lip 45. Alternatively, if a pair of flat walls is desired, an alternative embodiment of the mold 90 is shown in FIG. 17 with a pair of rectilinear shaped cavities 91*a* and *b*. Here, no insert is required. Mold 60 generates block 70 with two flat surfaces 71 and 72 shown in FIGS. 11*c* and 18.

Figure 6:
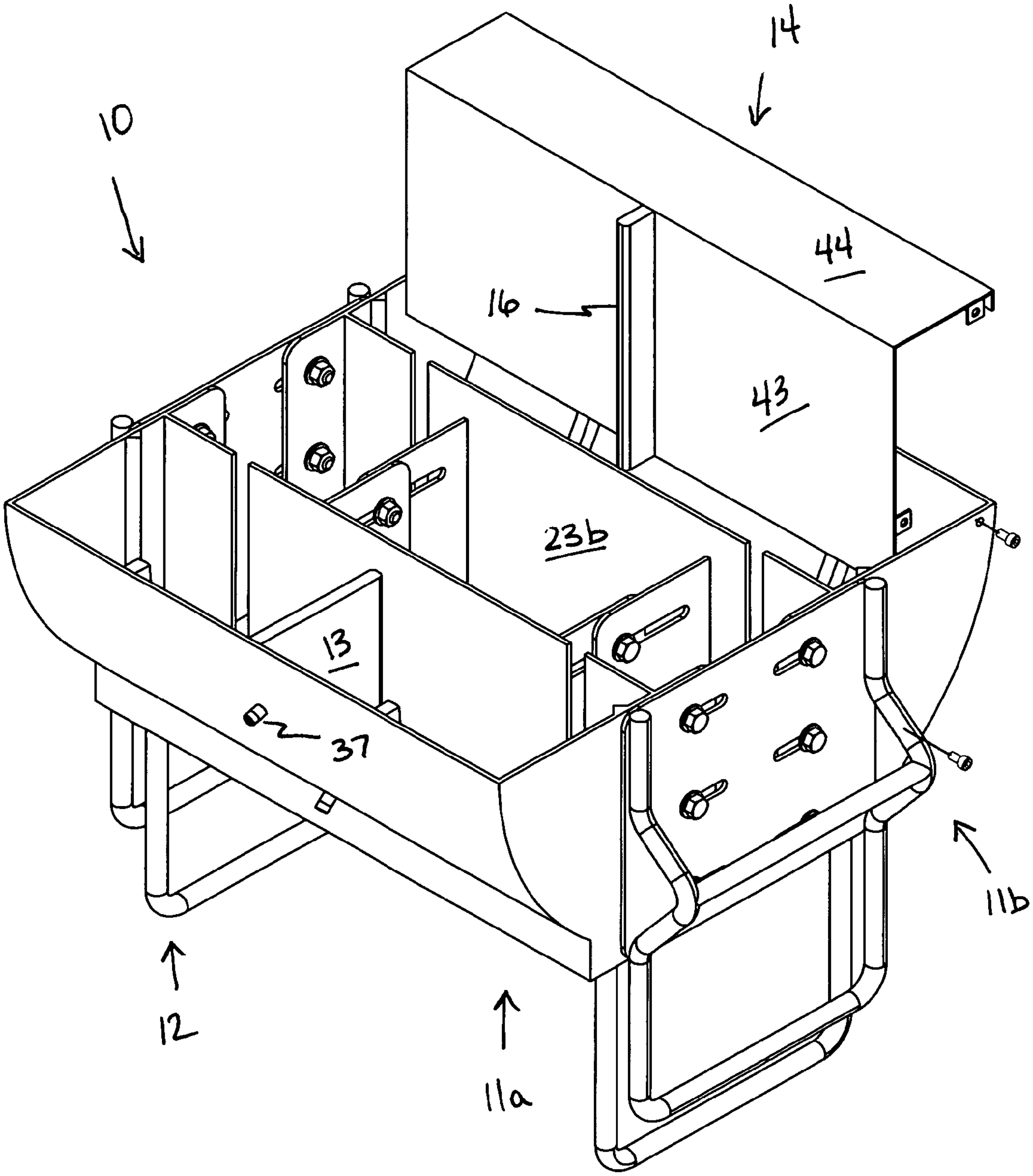
FIG. 6 is a perspective view of the mold of FIG. 4, further showing half block inserts placed on the curved wall forming cavity and being placed in the flat wall cavity.
Figure 8:
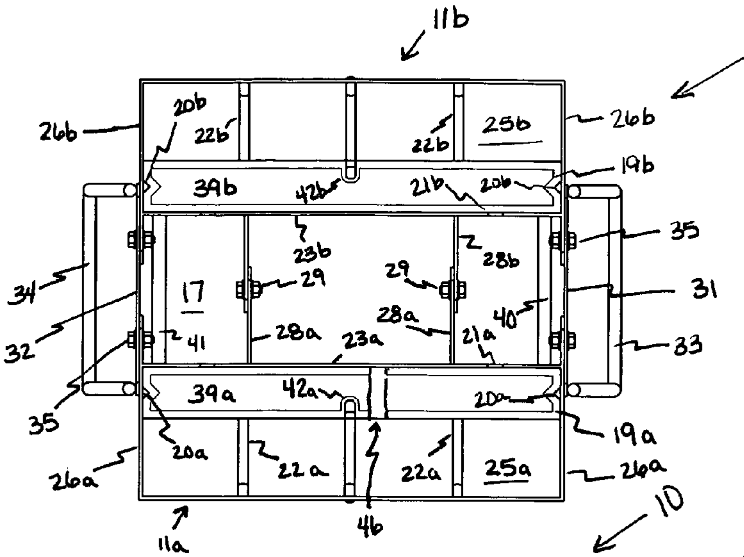
FIG. 8 is a top plan view of the mold of FIG. 2.
Figure 7:
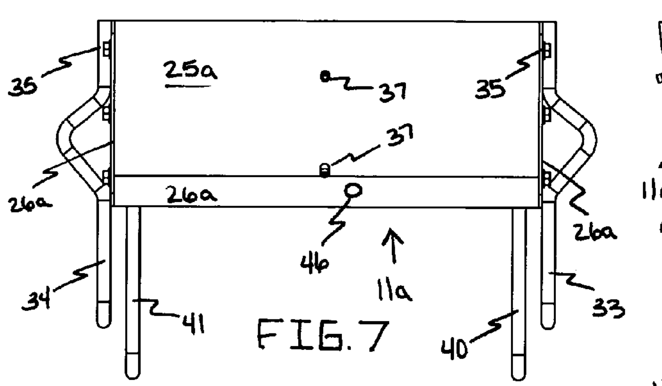
FIG. 7 is a side elevation view of the mold of FIG. 2.
Figure 10:
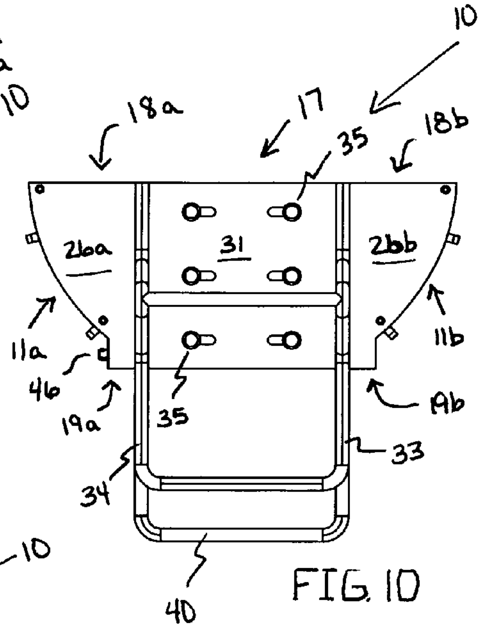
FIG. 10 is an end view of the mold of FIG. 2.
Figure 9:
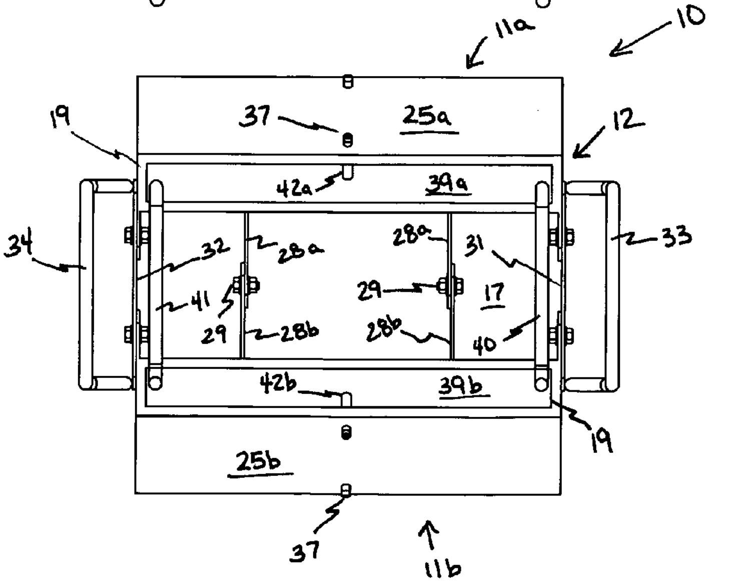
FIG. 9 is a bottom view of the mold of FIG. 2.

FIG. 6 shows an optional half block separator 16 which is intended to span the width of flat space 15 of for example FIG. 5.

In use, the mold 10 is initially disposed as shown in FIG. 2 to receive a cemititous composition such as cement. After addition of cement and any compaction via vibration or the like, the mold 10 is inverted as shown in FIG. 1. The press 12 is pushed downward to eject a block therefrom. The block is then cured, preferably by setting a predetermined period of time. Cement or other material may be shoveled or poured directly in the openings 18*a* and *b*. Alternatively, guide 100 shown in FIGS. 14, 15 and 16 may be placed on a mold (in this example, dual flat wall mold 90) to aid placement. Guide 100 includes a collar 101 and a divider fin 102 which forms apertures 103*a* and *b* which align with openings 18*a* and *b*.

FIGS. 11A-C show exemplary block embodiments of the present invention, which are preferably formed by the mold embodiments discussed above. Block 50 shown in FIG. 11A is formed by mold 10 described above. The block 50 includes a pair of bodies 51*a* and *b*, one or more rods, shafts or connectors 52 extending between the bodies 51*a* and *b* connecting and separating them a predetermined distance, and an insulation space 53 between the bodies 51*a* and *b* of the predetermined width distance. Each body 51 has a curved outer or exterior face 54 preferably in the form of a quarter cylinder configuration. Grooves 55 are preferably made in face 54 to aid in holding stucco or other surface finishing compounds or materials. A score line 58 may be made in the bodies 51 to permit breaking of block 50' into half blocks (not shown). FIG. 11B shows a block 60 comprising a curvilinear surface body 61 and a flat surface body 62 connected via rods 63. Score line 68 may be added to aid in forming half blocks from full block 60'. This block 60 is preferably formed by mold 10 utilizing flat wall insert 14. FIG. 11C shows block 70 comprising two flat surface bodies 71 and 72 connected by rods 73. Score line 78 may be added to aid in forming half blocks from full block 70'. Surface grooves (not shown) are optional. This block 70 may be formed by mold 10 utilizing an insert 14 disposed in each body 11. Alternatively, it may be formed by mold 90 shown in FIG. 22, which has rectilinear forming cavities 91*a* and *b*.

Figure 12:
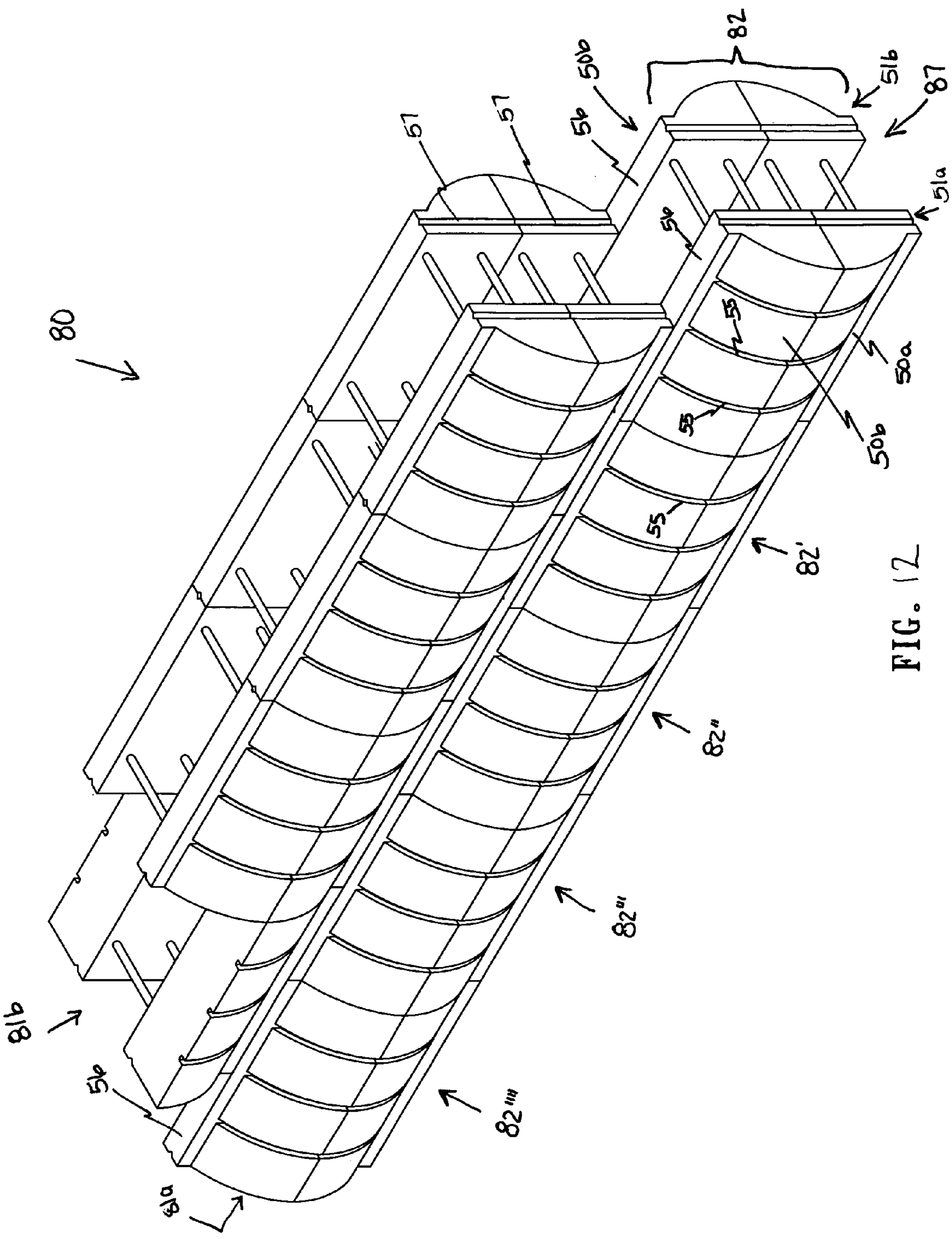
FIG. 12 is a perspective view of plural courses of blocks laid to construct a wall of a building or other structure.
Figure 18:
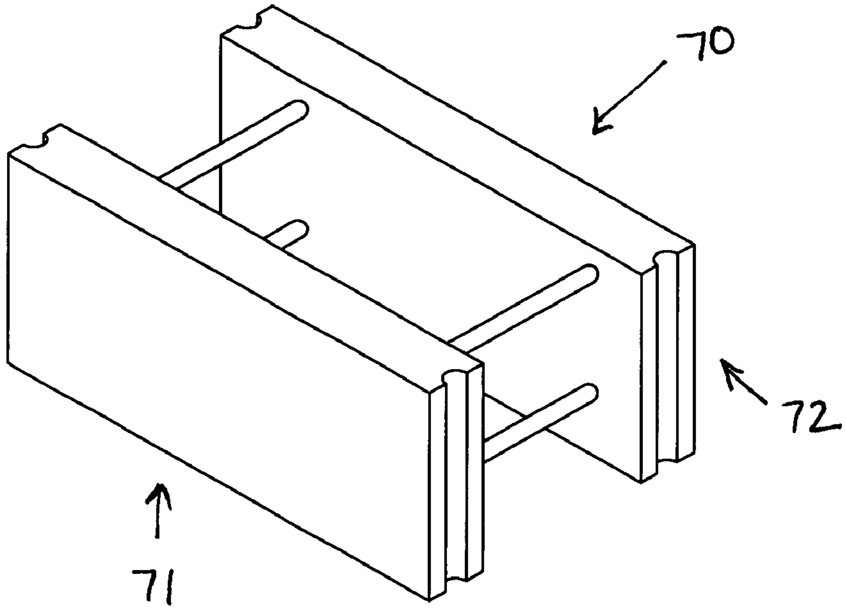
FIG. 18 illustrates a block produced by the mold of FIG. 17.

Referring to FIG. 12, structures such as wall 80 are formed by plural stacked courses 81, for example 81*a*, 81*b* and 81*c*, each of which is made up of plural side by side blocks 82, each of which is in turn formed by stacked lower and upper block halves 50*a* and *b*. The curved, quartercylinder surface 54 of block 50A is mated with that of block 50B to form a half or hemi cylinder composite block 82 structure, which resembles a segment of a half log on each side. Additional composite of full blocks 82', 82", 82'", 82"" are placed next to or side by side each other (abuting ends 57) to form a course 81*a* of blocks. Plural courses of structures 81*a*, 82*b* and the line may be mated to form a wall 80 or other structure having the general appearance of one being formed of logs or timbers. Grooves 55 are preferably disposed in the blocks 50 to aid in retention of stucco 89 or other optional surface finishes, for example shown being manually applied in FIG. 17 to wall 80. Stucco or other material may also be sprayed on by means of a sprayer. Courses of blocks may further be modified or adjusted to form log Corner structures for example as shown in FIG. 18. Mortar grooves 57 are preferably disposed in the sides of the blocks 50 to improve the side by side connection between the blocks in a course. Flat course supporting edges 56 in blocks 50 improve stacking of courses. Space 17 forms insulation space 53 in the blocks 50 of FIG. 11A. Rods 52 extend accross space 53 between block members 51*a* and *b*.

Figure 14:
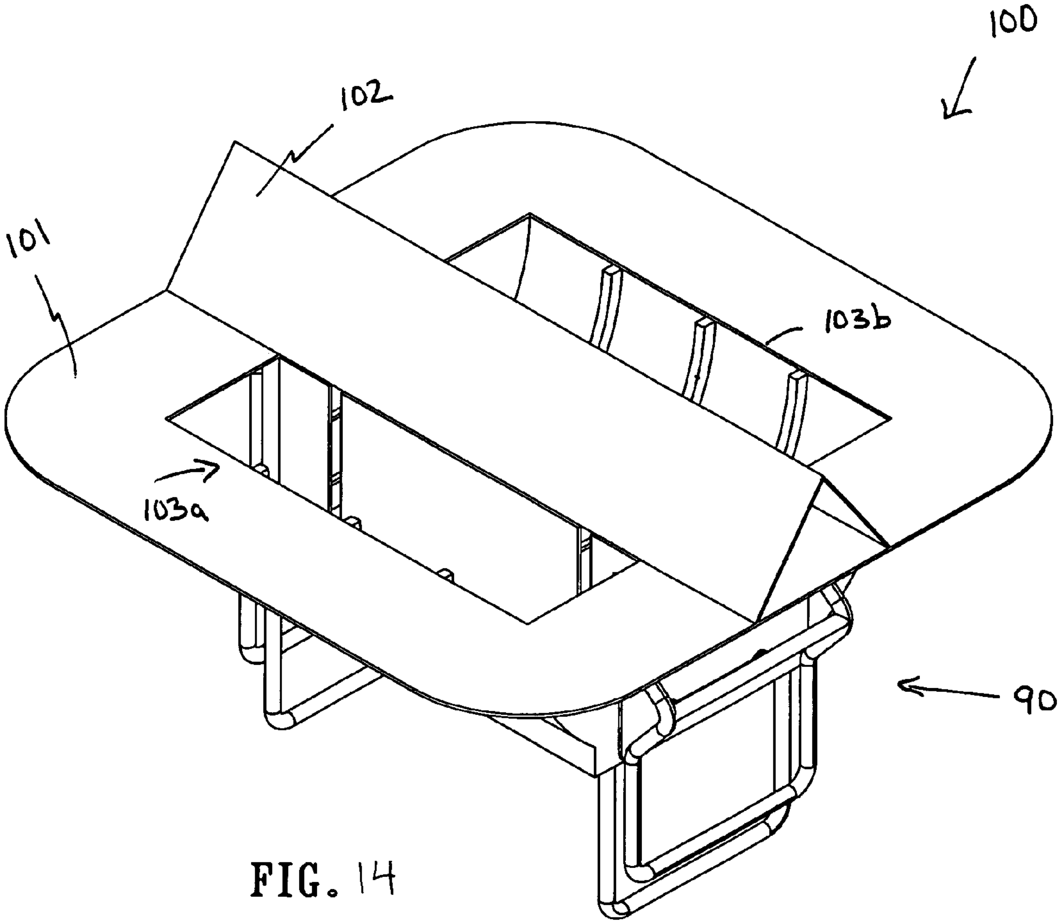
FIG. 14 is a perspective view of a mold with a concrete input guide operatively disposed thereon.
Figure 15:
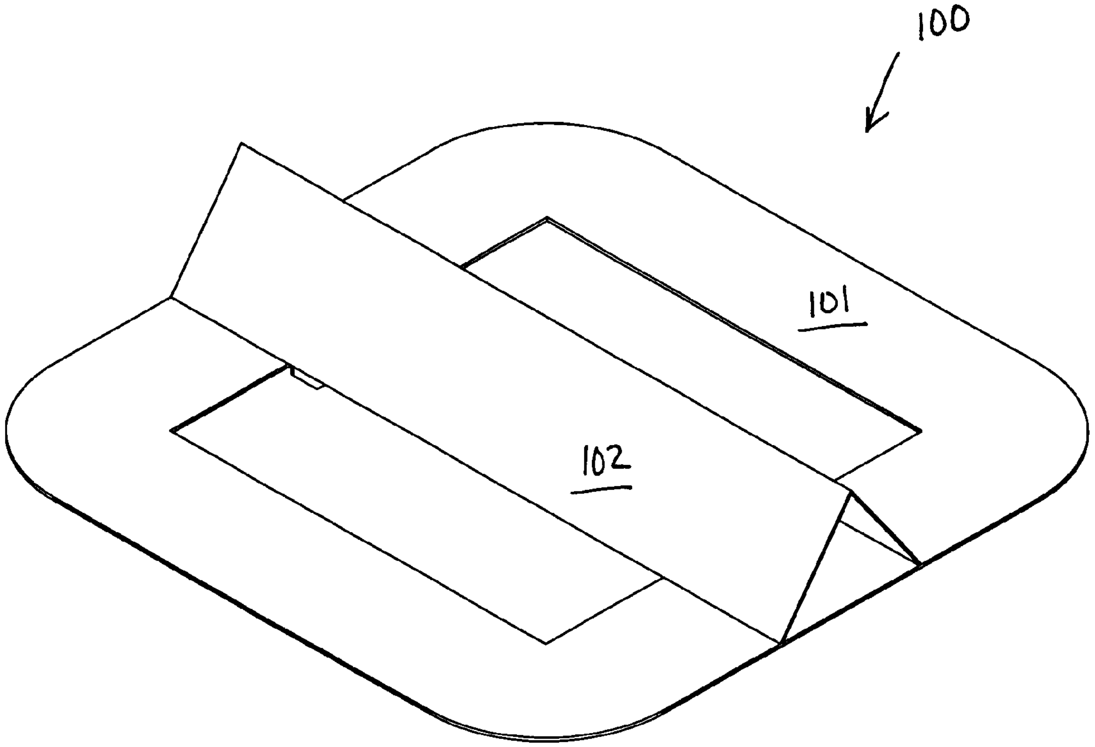
FIG. 15 is a perspective view of the input guide.
Figure 16:
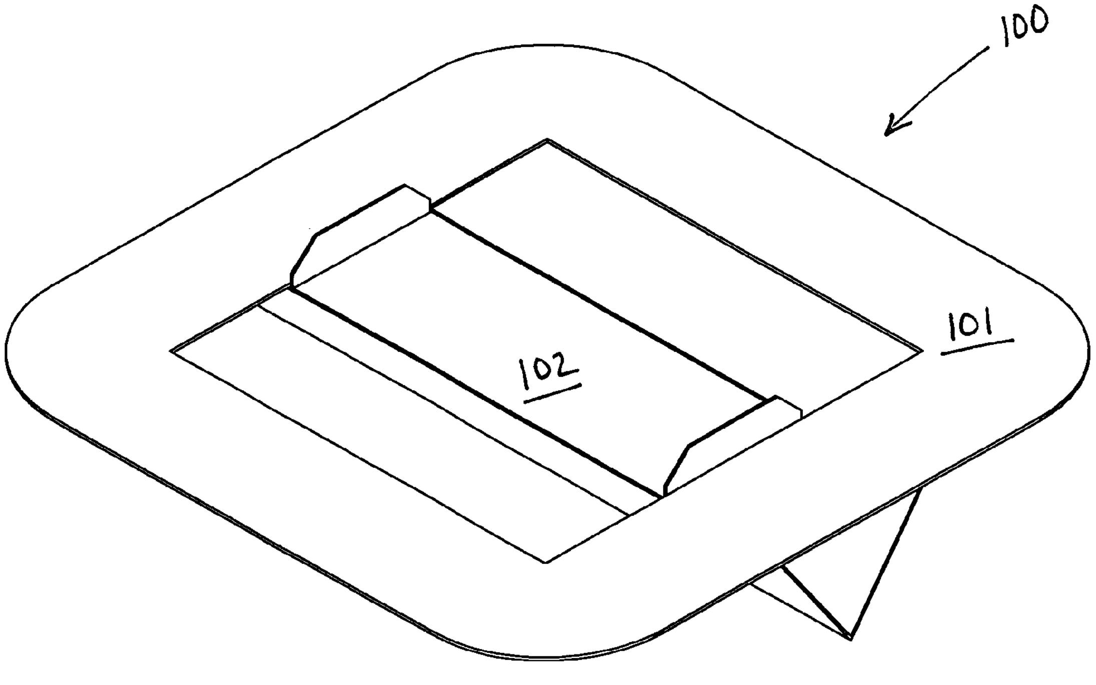
FIG. 16 is a perspective view of the input guide of FIG. 15, shown inverted.

As was discussed above, cemetitious material may be placed into molds, optionally with the aid of guide funnels, such as guide funnel 100 shown in FIGS. 14-16.

Further, blocks may be produced by an extrusion or other mass production process.

The descriptions above and the accompanying drawings should be interpreted in the illustrative and not the limited sense. While the invention has been disclosed in connection with an embodiment or embodiments thereof, it should be understood by those skilled in the art that there may be other embodiments which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

embodiments which fall within the scope of the invention.

What is claimed is:

1. A mold comprising:

a. a body including a pair of block forming cavities each having a material ingress-egress opening adapted to receive a block forming composition and to output a block, the block forming cavities being separated a predetermined distance by a space forming central cavity, wherein the body includes a pair of body members each having an inner wall member disposed adjacent the central cavity, an outer wall member, and a pair of side wall members connecting the outer and inner wall members at oppose ends, the wall members defining one block forming cavity of a predetermined configuration, and wherein the body member inner wall is flat and the body member outer wall is curved; and b. a block ejector movably connected to the body and including a plate member associated with each cavity, and a handle.

2. The mold of claim 1, wherein each block forming cavity has an ejector plate opening disposed at an end of the block forming cavity opposite the ingess-egress opening.

3. The mold of claim 1, wherein the body member inner wall and body member outer wall are curved.

4. The mold of claim 1, wherein the body member inner wall is flat and the body member outer wall is flat.

5. The mold of claim 2, wherein there is a flat face portion adjacent the ejector plate opening.

6. The mold of claim 2, wherein the outer wall has at least one rib disposed on its interior side.

7. The mold of claim 1, further including a pair of connector plates which connect the body members to each other at opposite ends, the connector plates mating with the side wall members of the body members.

8. The mold of claim 7, wherein each connector plate has a handle member.

9. The mold of claim 7, wherein each body member further has at least one connector panel disposed to cross a portion of the central cavity and mate with a connector panel of the opposing body member.

10. The mold of claim 9, wherein the body members, connector plates and connector panels have elongated slots for adjustable mating connection of the body members and connector plates, and the connector panels, via fasteners.

11. The mold of claim 1, wherein each inner wall member has at least one slot adapted to recive a connector element for extension from the block forming cavity of one body member, across the central cavity, and into the block forming cavity of the other body member.

12. The mold of claim 2, wherein each ejector plate opening is disposed within the block forming cavity, is flat and has a horizontal dimension which is slightly larger than that ejector plate opening, and the handles extend through the ejector plate openings.

13. The mold of claim 1, further comprising a half block separator disposed across and dividing a block forming cavity.

14. The mold of claim 1, further comprising a flat wall insert disposed in a block forming cavity, the flat wall insert having a first wall disposed parallel to and a predetennined distance from the inner wall of the block forming cavity, and a second wall extending from the first wall at an angle to contact the curved outer wall, whereby the flat wall insert defines a substantially rectilinear block forming cavity shields the curved outer wall from contact with block forming material.

15. A mold for cemititious material for forming a block having a pair of block members, one of which has a curved outer face, the block members being separated by a central insulation space and connected by rods extending from each block member across the central insulation space, comprising:

a. a body including:

i. a first body member having an inner wall member disposed adjacent the central cavity, a curved outer wall member, and a pair of side wall members connecting the outer and inner wall members at oppose ends, the wall members of the first body member defining a first block forming cavity of a predetermined configuration, the first block forming cavity having a material ingress-egress opening adapted to receive a block forming composition and to output a first formed block member, and an ejector plate opening disposed at an end of the block forming cavity opposite the ingess-egress opening;

ii. a second body member having an inner wall member disposed adjacent a central cavity between the first block forming cavity of the first body member, an outer wall member, and a pair of side wall members connecting the outer and inner wall members at oppose ends, the wall members defining a second block forming cavity of a predetermined configuration, the second block forming cavity having a material ingress-egress opening adapted to receive a block forming composition and to output a second block member, and an ejector plate opening disposed at an end of the second block forming cavity opposite the ingess-egress opening, the first and second block forming cavities being separated a predetermined distance by the space forming central cavity;

iii. a pair of connector plates which connect the first and second body members to each other at opposite ends, the connector plates mating with the side wall members of the first and second body members; and b. a block ejector movably connected to the body and including a plate member associated with each cavity, and a handle.

16. A mold comprising:

a. a body including a pair of block forming cavities each having a material ingress-egress opening adapted to receive a block forming composition and to output a block, the block forming cavities being separated a predetermined distance by a space forming central cavity; wherein the body includes a pair of body members each having an inner wall member disposed adjacent the central cavity, an outer wall member, and a pair of side wall members connecting the outer and inner wall members at oppose ends, the wall members defining one block forming cavity of a predetermined configuration, and wherein each block forming cavity has an ejector plate opening disposed at an end of the block forming cavity opposite the ingess-egress opening; and b. a block ejector movably connected to the body and including a plate member associated with each cavity, wherein there is a flat face portion adjacent the ejector plate opening, and a handle.

17. A mold comprising:

a. a body including a pair of block forming cavities each having a material ingress-egress opening adapted to receive a block forming composition and to output a block, the block forming cavities being separated a predetermined distance by a space forming central cavity, wherein the body includes a pair of body members each having an inner wall member disposed adjacent the central cavity, an outer wall member, and a pair of side wall members connecting the outer and inner wall members at oppose ends, the wall members defining one block forming cavity of a predetermined configuration, and wherein each block forming cavity has an ejector plate opening disposed at an end of the block forming cavity opposite the ingess-egress opening and wherein the outer wall has at least one rib disposed on its interior side; and b. a block ejector movably connected to the body and including a plate member associated with each cavity, and a handle.

18. A mold comprising:

a. a body including a pair of block forming cavities each having a material ingress-egress opening adapted to receive a block forming composition and to output a block, the block forming cavities being separated a predetermined distance by a space forming central cavity;

b. a half block separator disposed across and dividing a block forming cavity; and c. a block ejector movably connected to the body and including a plate member associated with each cavity, and a handle.

* * * * *